United States Patent [19]

Kapec et al.

[11] Patent Number: 4,989,167

[45] Date of Patent: Jan. 29, 1991

[54] DESKTOP COMPUTER TERMINAL HAVING AN ANGULARLY ADJUSTABLE ELECTRONIC DISPLAY MODULE

[76] Inventors: Jeffrey Kapec, 248 Wilton Rd., Westport, Conn. 06880; Kazuna Tanaka, 5 Frontier Rd., Cos Cob, Conn. 06807

[21] Appl. No.: 405,276

[22] Filed: Sep. 11, 1989

[51] Int. Cl.⁵ ............................................. G06F 1/00
[52] U.S. Cl. .................................................... 364/708
[58] Field of Search ................. 364/708; 248/917–923

[56] References Cited

U.S. PATENT DOCUMENTS 4,841,412  6/1989  Heys, Jr. et al. ..................... 364/708

OTHER PUBLICATIONS

"Tilt Swivel Mechanisms" IBM Technical Disclosure Bulletins, vol. 30, #5, pp. 112–115, Oct. 1987.
"Tilting Mechanism", IBM Technical Disclosure Bulletin, vol. 29, #8, pp. 3408–3409, Jan. 1987.
"Display Tilt Mechanism" IBM Technical Disclosure Bulletin, vol. 29, #9 pp. 3869–3870, Feb. 1987.
"Tilt and Swivel Mechanism for a CRT Monitor", IBM Technical Disclosure Bulletin, vol. 29, #12, pp. 5585–5586.
"Tilt/Swivel Device for CRT Housing", IBM Technical Disclosure Bulletin, vol. 30, #4, pp. 1861–1862, Sep. 1987.

*Primary Examiner*—Dale M. Shaw
*Attorney, Agent, or Firm*—Michael Ebert

[57] ABSTRACT

A desktop computer terminal having a keyboard in which an operator can enter data and an electronic display module for presenting data entered into and received by the terminal. The module casing is defined by a semi-cylindrical trough covered by a panel on which the display is mounted, the module being nested in a complementary cradle defined by a concavity in the housing of the terminal adjacent the planar face of the keyboard. The module is shiftable from a zero position in which its panel is coplanar with the face of the keyboard, at which position the module is fully nested in the cradle, to an angled position at which the panel is more or less inclined with respect to the keyboard face and the module is then partially nested in the cradle. Means are provided to maintain the display module at that angle which affords optimum visibility.

9 Claims, 4 Drawing Sheets

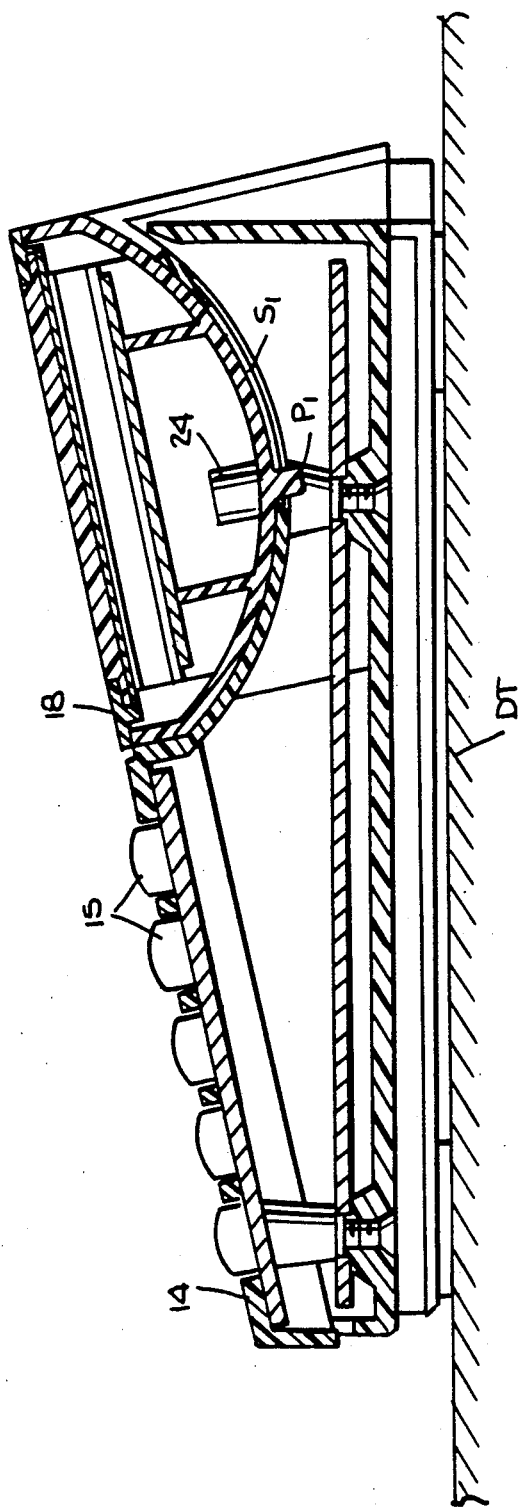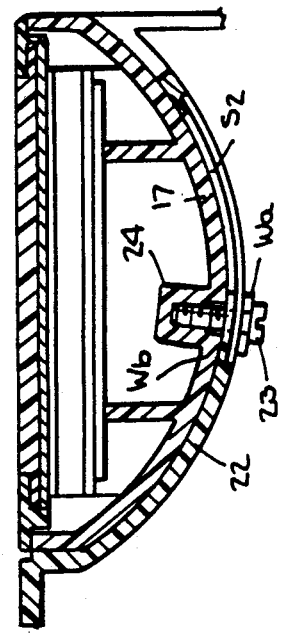

DESKTOP COMPUTER TERMINAL HAVING AN ANGULARLY ADJUSTABLE ELECTRONIC DISPLAY MODULE

BACKGROUND OF INVENTION

1. Field of Invention:

This invention relates generally to computer terminals provided with a keyboard and an electronic display, and more particularly to a desktop terminal having an electronic display module whose angular position is adjustable so as to orient the display relative to the operator of the terminal to render the display fully visible under prevailing ambient light conditions.

2. Status of Prior Art:

A computer terminal is a device that allows a user of a data processing system to gain access to the system at a remote location. Remote terminal data processing systems, often referred to as teleprocessing systems, represent a form of information processing in which a multiplicity of remote terminals access a computer by way of communication lines. Such teleprocessing systems which are now widely used can provide various data processing services to many locations without the need for a computer at each location.

In a teleprocessing system of the inquiry and response type, the computer functions as a mass storage facility which can be accessed via a communication network, the files of the computer being updated automatically. Examples of systems of the inquiry and response type are the various airline and hotel reservation systems in which the user enters a query at a terminal, thereby causing the computer to search its files and to send back the requested information to the remote terminal.

In the well known SABRE II reservation system for American Airlines, nearly 2000 terminals at various locations throughout the country are supported by two IBM computers, one of which is a backup. Approximately a million inquiry messages are handled daily.

The concern of the present invention is with a desktop computer terminal provided with a keyboard by which an operator is able to enter data, and an electronic display to present to the operator data entered into and received by the computer terminal. Among the commercially available types of electronic displays for desktop computer terminals are the light-emitting-diode (LED) display and the liquid-crystal-display (LCD). Such displays lend themselves to compact and portable design configurations, unlike video displays which require a cathode ray tube.

Human factors or human engineering deals with the human-machine interface. The question that arises in a user-display interface is whether the display can be read easily, accurately and without operator fatigue. Even assuming that in a computer desktop terminal the electronic display is such that the letters, numbers, characters and other elements of the display in regard to size and font are highly visible and free of flicker, the display may nevertheless not be clearly visible to the operator, and indeed may be very difficult to read. (See: Electronic Displays by E. G. Bylander - Texas Instruments Electronic Series, McGraw Hill Book Co. 1979 - Chapter 3 - Display Human Factors.)

An operator sitting before an electronic display covered by a window in which numerals, letters and characters are exhibited in black against a grayish background, as in a typical LCD display, will find that the readability of the display depends in large measure on the angle assumed by the display window relative to incident ambient light.

To give a simple analogy: With a digital watch having an LCD time display, it is a common experience for the user to find that at most angles at which the dial of the watch is viewed, light rays reflected from the watch crystal interfere with the visibility of the display. The dial can best be read at that angle at which rays reflected from the watch crystal are directed away from the eyes of the viewer.

The same problem arises in a conventional electronic display incorporated in a desktop computer terminal. Because the electronic display occupies a fixed position determined by the placement of the computer terminal on the desk, an operator may find the display difficult if not impossible to read under prevailing ambient light conditions.

It is for this reason that an operator may try to prop up the desktop terminal to find an angle at which the visibility of the display is improved. But an angle suitable for one operator may not be acceptable to another who is shorter or taller. Moreover, the terminal keyboard is best operated when the terminal lies flush on the desktop and is not angled with respect thereto.

Another common approach to this problem is to provide an electronic display unit that is separate from the keyboard section of the desktop computer terminal The advantage of a separate electronic display unit is that the display may be pivotally supported on a stand so that it can be oriented relative to the operator. But where the desideratum is a highly compact, self-sufficient, desktop computer terminal, this solution is not acceptable.

Another drawback of a separate electronic display unit is that it requires a plug-in cable connection between the unit and the terminal, and this may result under certain circumstances in a poor or defective connection therebetween.

SUMMARY OF INVENTION

In view of the foregoing, the main object of this invention is to provide a highly compact, self-sufficient desktop computer terminal having a keyboard and an electronic display module whose angular position is adjustable so as to orient the display relative to the operator to render the display fully visible under prevailing light conditions.

A significant advantage of the invention is that the angle assumed by the electronic display module may be readily set to optimize the readability of the display for different operators and under different ambient light conditions. Thus, regardless of where the terminal is installed and regardless of who at any given time is operating the terminal, the angular position of the module may be adjusted to accommodate existing conditions.

More particularly, an object of this invention is to provide a desktop computer terminal in which the angle assumed by the display module is adjustable throughout a relatively broad range whose minimum angle is one in which the panel of the module is coplanar with the face of the keyboard and whose maximum angle is one in which the panel is sharply inclined with respect to the keyboard.

Yet another object of the invention is to provide a computer terminal in which the angularly adjustable display module is permanently connected to the operating circuits of the terminal by a single, multi-line, flexible strap which maintains the necessary connections regardless of the angle assumed by the module and without resisting angular adjustment.

Also an object of the invention is to provide a desktop computer of the above type which operates reliably and efficiently, and which can be manufactured at relatively low cost.

Briefly stated, these objects are attained in a desktop computer terminal having a keyboard in which an operator can enter data and an electronic display module for presenting data entered into and received by the terminal. The module casing is defined by a semi-cylindrical trough covered by a panel on which the display is mounted, the module being nested in a complementary cradle defined by a concavity in the housing of the terminal adjacent the planar face of the keyboard.

The module is shiftable from a zero position in which its panel is coplanar with the face of the keyboard, at which position the module is fully nested in the cradle, to an angled position at which the panel is more or less inclined with respect to the keyboard face and the module is then partially nested in the cradle. Means are provided to maintain the display module at that angle which affords optimum visibility.

BRIEF DESCRIPTION OF DRAWINGS

For a better understanding of the invention as well as other objects and further features thereof, reference is made to the following detailed description to be read in conjunction with the accompanying drawings, wherein:

FIG. 4 is a transverse section taken through the terminal, with the module at its zero position;

FIG. 5 is a section taken through the display module and its complementary cradle;

DESCRIPTION OF INVENTION

Figure 1:
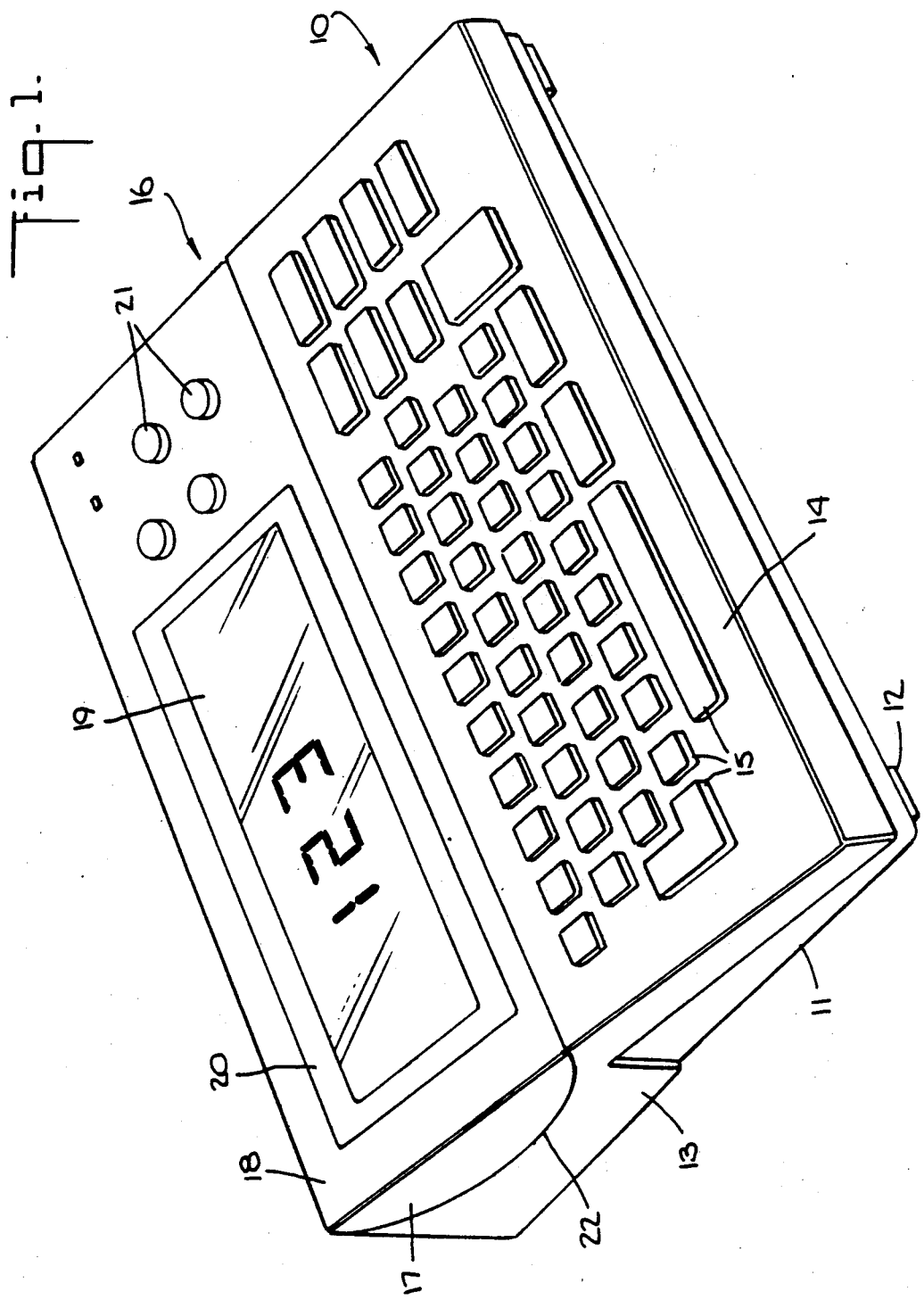
FIG. 1 is a perspective view of a desktop computer terminal that includes an angularly adjustable electronic display module in accordance with the invention.
Figure 2:
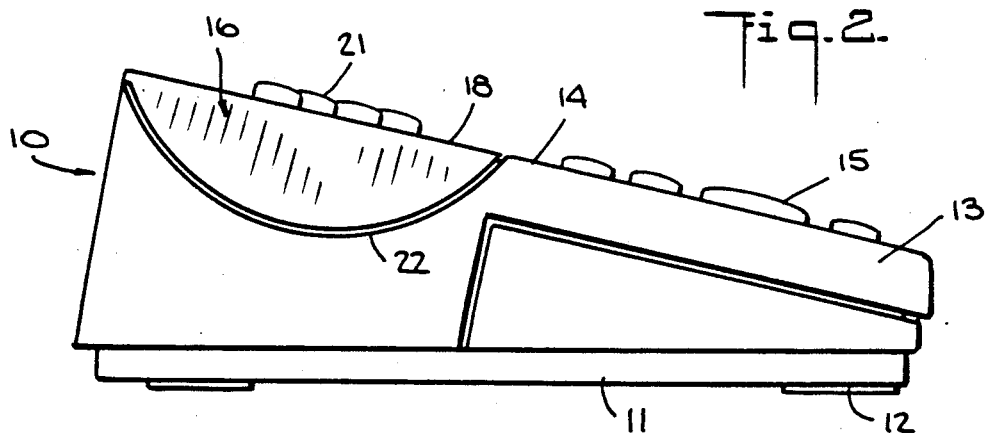
FIG. 2 is a side view of this terminal showing the display module at its zero position in a predetermined angular range.

Referring now to FIGS. 1 to 4, there is shown a desktop computer in accordance with the invention, generally identified by reference numeral 10. Terminal 10 is encased in a housing having a base section 11 provided at its underside with pads 12 which rest on the desktop DT on which the terminal is placed, and an upper section 13 which is joinable to the base section. In practice, the housing may be molded of synthetic plastic material of high strength, such as polyolefin or polycarbonate.

Upper section 13 is provided with a keyboard having a planar face 14 that is slightly inclined relative to the base section to facilitate manipulation by an operator of keys 15, making it possible for the operator to enter data into the terminal and to query the computer to which the terminal is linked.

The present invention is applicable to any desktop computer terminal having an electronic display, regardless of the service rendered by the system of which the terminal is a part. Hence the nature of the internal circuits of the terminal and the particular functions carried out by the keyboard at not material to the invention. It is also applicable to small desktop computers used for record keeping, calculations, word processing, and the storage and transfer of information, including those associated with a printer and a disc-drive system for software.

Parallel to the keyboard is an electronic display module, generally designated by numeral 16, having a casing defined by a semi-cylindrical trough 17 covered by a rectangular panel 18 on which an electronic LCD or other display represented by number "123." is mounted behind a window 19 held within a rectangular frame 20.

Display module 16 is provided with control elements 21 appropriate to its function. Since the invention is applicable to any display module irrespective of its function, the specific functions carried out by the display and the nature of its alphanumeric or other presentation are not material to the invention.

Display module 16 is nested within a complementary cradle 22 defined by a concavity in upper section 13 of the terminal housing. The cradle is adjacent the keyboard so that an operator sitting or otherwise situated in front of the keyboard can operate the keyboard and at the same time view the display which presents data entered by the operator and information received by the terminal from a computer linked thereto.

FIGS. 1 and 4 illustrate display module 16 when it is fully nested in cradle 22 whose concavity conforms to the convex trough 17 whereby panel 18 of the module is then coplanar with the flat face 14 of the keyboard. This relationship constitutes the zero angular position of the module which is rockable in the cradle to an angular position within a predetermined range.

Figure 3:
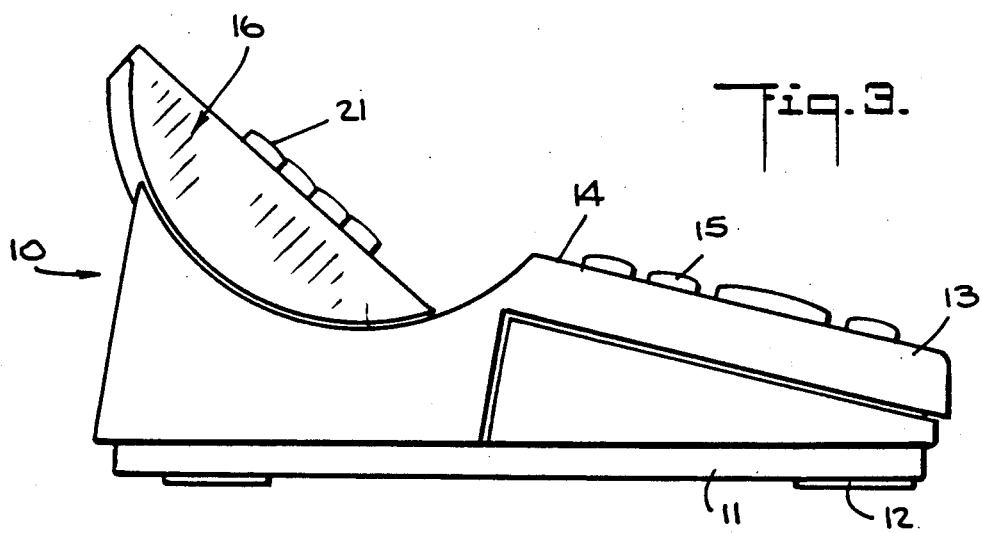
FIG. 3 is a side view of the terminal showing the display module at its maximum angular position in the range.

Thus FIG. 3 shows the maximum angle in the range in which panel 18 of module 16 is sharply inclined relative to face 14 of the keyboard, and the module is then partially nested in the cradle. Module 16 is angularly adjustable to assume any desired angular position in the range, and to effect this adjustment the operator need only depress the module to rock it in the cradle until the angle of view is such as to attain optimum visibility of the display under prevailing light conditions.

Figure 7:
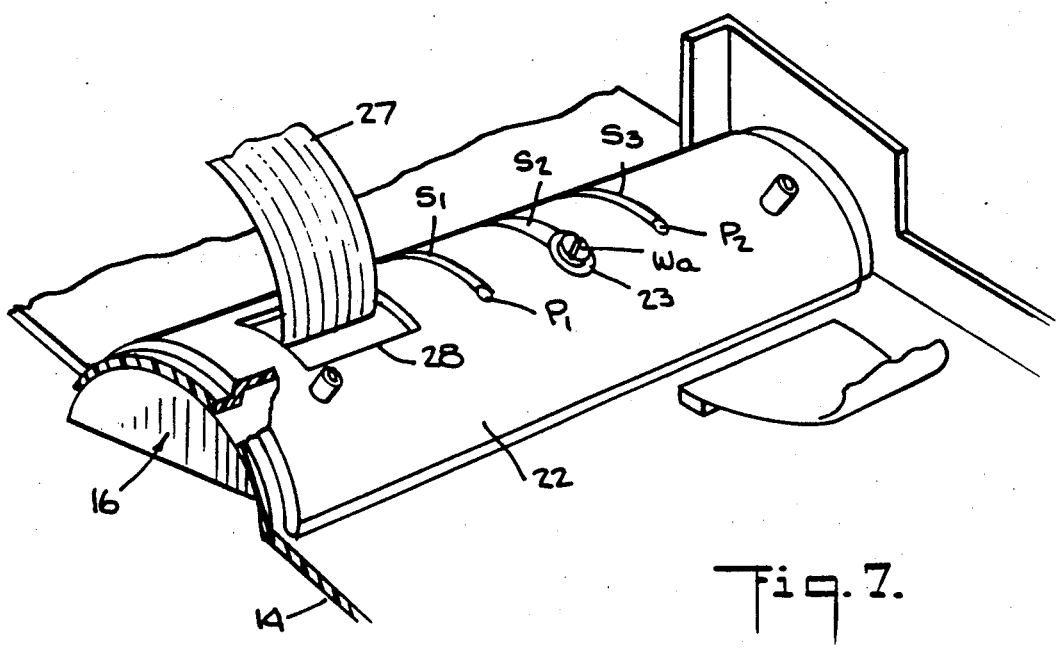
FIG. 7 shows the underside of the cradle in which the electronic display module is nested.

As shown in FIGS. 4, 5 and 7, cradle 22, which nests module 16, is provided with a series of parallel arcuate slots $S_1$, $S_2$ and $S_3$ which define the range of angular adjustment. On the underside of module 16 are guide pins $P_1$ and $P_3$ which ride in slots $S_1$ and $S_3$. Also provided is a screw 23 which rides in slot $S_2$ and is received in an internally-threaded boss 24 formed on the inner surface of semi-cylindrical trough 17 of the module. Mounted on screw 23 on either side of cradle 22 are compressible washers $W_a$ and $W_b$ formed of neoprene or similar material which are more or less compressed by screw 23 to resist movement of the module and thereby maintain the module at whatever angular position it is set by the operator. The degree of resistance is adjustable by turning screw 23, the resistance being sufficient to hold the module at a set angle, but not so great as to prevent readjustment of this angle.

Figure 6:
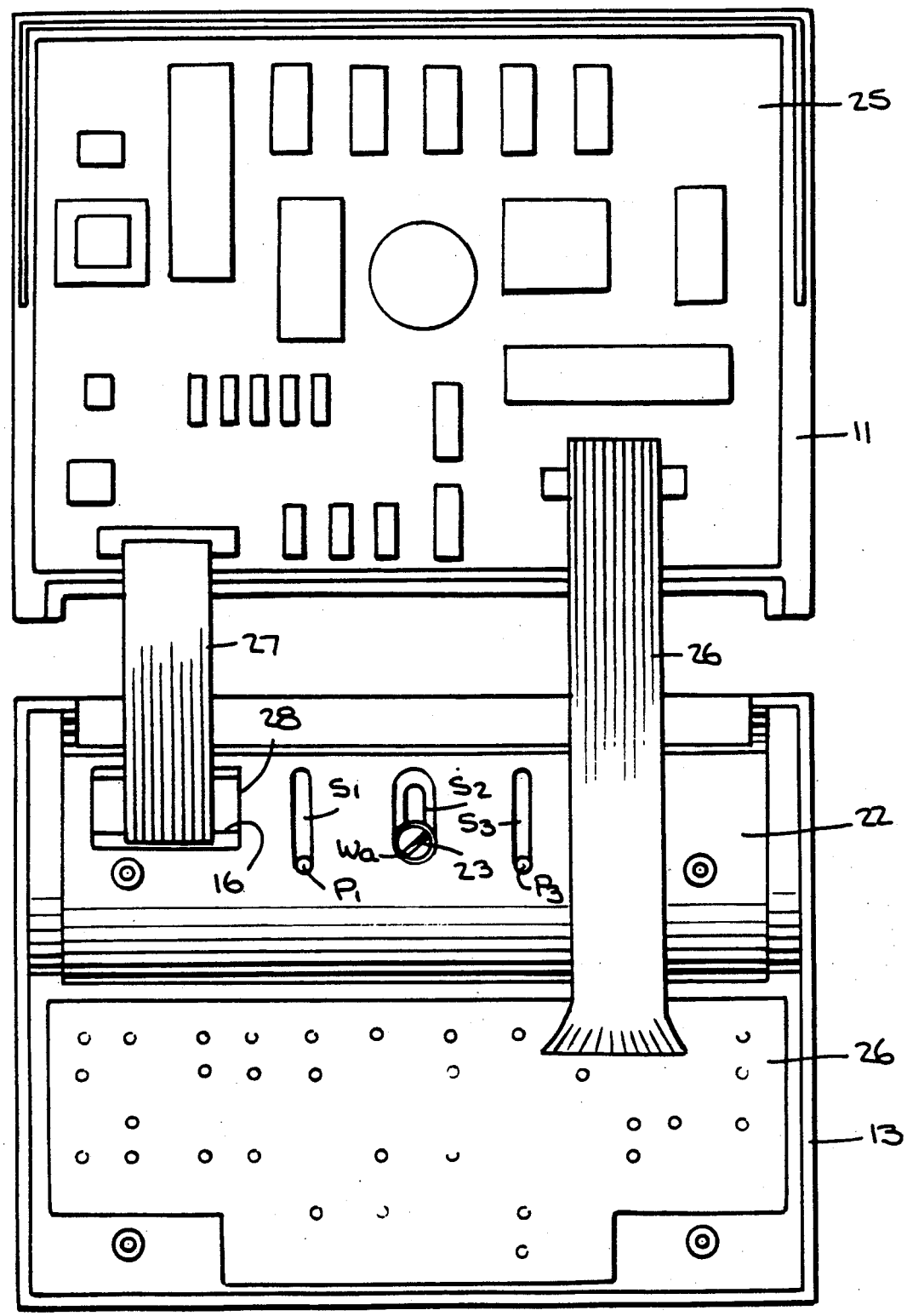
FIG. 6 illustrates in plan view the base and upper sections of the terminal when detached from each other.

As shown in FIG. 6, the base section 11 of the terminal housing is provided with a circuit board 25 which is connected by a multi-line strap 26 of flexible material to a circuit board 26 mounted in the upper section 13 of the terminal housing. Circuit board 25 is also connected by a multi-line flexible strap 27 to the circuits in module 16, a rectangular port 28 being formed in cradle 22 parallel to slots $S_1$ and $S_3$ to permit movement of flexible strap 27 when the angular position of the module is adjusted. Hence there is a permanent connection between the module and terminal circuits which is maintained regardless of the module adjustment.

While there has been shown and described a preferred embodiment of a desktop computer terminal having an angularly adjustable electronic display module in accordance with the invention, it will be appreciated that many changes and modifications may be made therein without, however, departing from the essential spirit thereof.

We claim:

1. A desktop computer terminal comprising:
   A. a keyboard for entering data in the terminal, said keyboard having a planar face and keys mounted thereon, said planar face being slightly inclined relative to the horizontal plane;
   B. an electronic display module for presenting data entered into the terminal by an operator at the keyboard and information received by the terminal from a computer, said module having a casing defined by a semi-cylindrical trough covered by a planar panel on which an electronic display is mounted; and
   C. a complementary cradle defined by a concavity for nesting the module at a position adjacent the keyboard, said module being shifted in the cradle in a predetermined angular range from a minimum zero angle position in which the module is fully nested in the cradle and the panel is then coplanar with the face of the keyboard to a maximum angular position in which the panel of the module is sharply inclined relative to the face of the keyboard and the module is then partially nested in the cradle, said module being adjusted to an angle at which the display is fully visible to the operator under prevailing light conditions.

2. A terminal as set forth in claim 1, wherein said electronic display is covered by a window coplanar with said face which window reflects ambient light and assumes an angle when the module is adjusted at which the ambient light is reflected away from the operator.

3. A terminal as set forth in claim 1, wherein said terminal is provided with a housing having a base section and an upper section joined thereto, the face of the keyboard and the cradle being formed in said upper section.

4. A terminal as set forth in claim 3, wherein said base section is provided with a first circuit board connected by a multi-line flexible strap to a second circuit board in said upper section, whereby the base and upper sections can be separated from each other to obtain access to the interior of the housing without breaking the connection between the first and second circuit boards.

5. A terminal as set forth in claim 1, wherein said display is an LCD display.

6. A terminal as set forth in claim 1, further including means to maintain the position of the module at any adjusted angle in said range.

7. A terminal as set forth in claim 6, wherein said means includes an arcuate slot in said cradle, a screw passing through said slot into an internally-threaded boss formed in the inner wall of the trough, and a compressible washer mounted on said screw to afford resistance against shifting of the module in the cradle.

8. A terminal as set forth in claim 7, further including at least one additional arcuate slot and a guide pin anchored on the module trough that rides in the additional arcuate slot to either end thereof.

9. A terminal as set forth in claim 4, further including a second multi-line flexible strap connected between the first circuit board in the base section and a second circuit board in the module, said cradle having a port therein to admit the second strap regardless of the angular position of the module in said range.

* * * * *